J. C. BIGELOW.
TATTING SHUTTLE.
APPLICATION FILED AUG. 16, 1916.

1,228,286.

Patented May 29, 1917.

Inventor
J. C. Bigelow

Witnesses

By
Attorney

UNITED STATES PATENT OFFICE.

JOSEPH C. BIGELOW, OF OLYMPIA, WASHINGTON.

TATTING-SHUTTLE.

1,228,286.	Specification of Letters Patent.	Patented May 29, 1917.

Application filed August 16, 1916. Serial No. 115,242.

*To all whom it may concern:*

Be it known that I, JOSEPH C. BIGELOW, a citizen of the United States, residing at Olympia, in the county of Thurston and State of Washington, have invented certain new and useful Improvements in Tatting-Shuttles; and I do hereby declare the following to be a full, clear, and exact description of the invention, such as will enable others skilled in the art to which it appertains to make and use the same.

This invention relates to improvements in tatting shuttles, and has for its primary object to provide means arranged within the sheath of the shuttle and connected with the thread-receiving spool for tensioning the latter as the thread is unwound so that the spool may be automatically rotated to wind a fresh supply of thread thereon.

With this and other objects in view, the invention consists in the novel construction, combination and arrangement of parts as will be hereinafter specifically described, claimed and illustrated in the accompanying drawing, in which:

Figure 1:
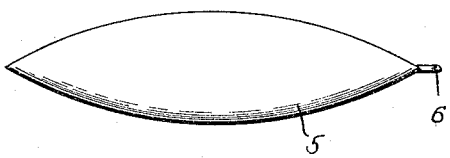
Figure 1 represents a plan view of the improved shuttle.

Referring to the drawing in detail, wherein similar reference numerals designate corresponding parts throughout the several views, the numeral 5 indicates generally the shell or sheath of the tatting shuttle, which may be of any approved shape and is provided at one end with the usual tatting hook 6. The sheath is constructed in two parts or sections hingedly secured together at 7, whereby access may be had to the interior of the sheath and the opposite wall of the latter is formed with a relatively small thread-receiving opening 8.

Figure 2:
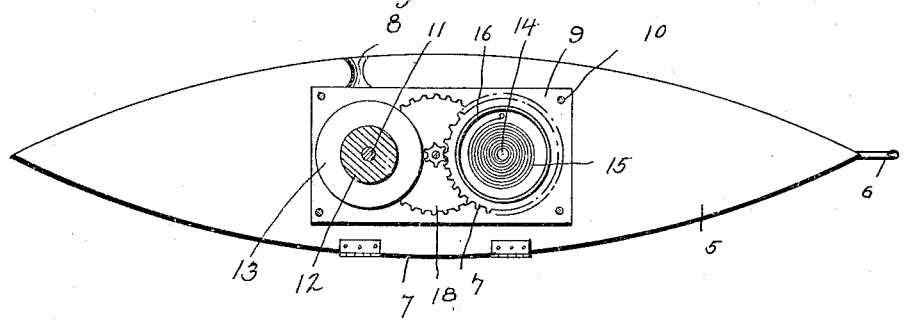
Fig. 2 represents a longitudinal sectional view therethrough.
Figure 3:
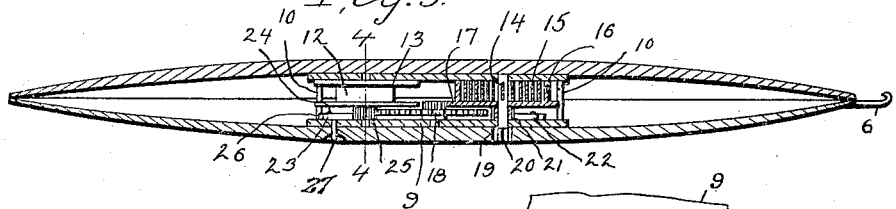
Fig. 3 represents a longitudinal sectional view at right angles to Fig. 2.
Figure 4:
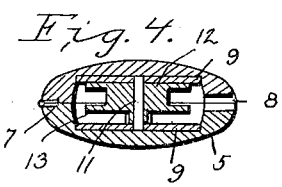
Fig. 4 represents a transverse sectional view on the line 4—4 of Fig. 3.
Figure 5:
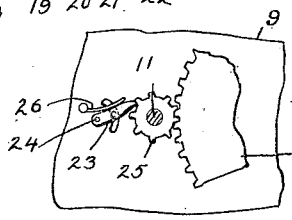
Fig. 5 represents a fragmentary side elevation of the shuttle, illustrating the pawl for locking the spring against unwinding.

A frame including a pair of side plates 9 is supported in the sheath 5 by rivets, or equivalent means 10, and rotatably supports a shaft 11 on which is non-rotatably secured the thread-receiving spool including the hub 12 and spaced circumferential flanges 13. As clearly shown in Fig. 2, the shaft 11 is mounted adjacent one end of the plates 9 and a second shaft 14 is rotatably mounted adjacent the opposite end thereof. One end of a coil spring 15 is connected with the shaft 14 and the opposite end thereof is connected with a laterally projecting flange 16 formed upon a relatively large gear wheel 17, which latter is rotatably mounted upon the shaft 14 and is connected by a train of gears 18 with the spool 12.

One end of the shaft 14 projects through an aperture 19 formed in one side of the sheath 5 and is squared, as indicated at 20, so as to permit a key or other tool to be applied thereto to facilitate winding of the spring 15. A small ratchet wheel 21 is rigidly secured to the shaft 14 and coöperates with a pawl 22 pivotally secured to one of the plates 9 to prevent the spring 15 from unwinding.

A pawl 23 is pivotally secured at 24 to one of the side plates 9 and coöperates with the teeth of the pinion 25, which meshes with the end gear wheel of the train 18. The pawl 28 is so arranged as to prevent the shaft 11 from rotating under the influence of the spring 15 and is normally retained in engagement with the teeth of the pinion 25 by a spring 26. The pawl 23 is connected with a laterally projecting arm 27, which protrudes through an aperture formed in one plate 9 and the adjacent side of the sheath 5, whereby it may be conveniently actuated to withdraw the free terminal of the pawl 23 from operative engagement with the teeth of the pinion 25, and thus permit the shaft 11 to rotate under the influence of the spring 15.

In use, the spring 15 is wound by a key or other suitable tool applied to the squared terminal 20 of the shaft 14 and one end of the thread may be secured in any suitable manner to the spool 12. The pawl 23 is subsequently swung outwardly from the pinion 25, thus permitting the shaft 11 and spool 12 to rotate under the influence of the spring 15, which latter is connected to the shaft 11 through the gear wheels 17 and 18 and pinion 25. When sufficient thread has been wound upon the spool 12 the pawl 23 is released and is automatically thrown into operative engagement with the teeth of the pinion 25 by the spring 26, thus locking the shaft 11 and spool against rotary movement in the direction in which they are normally urged by the spring 15. As the thread is unwound from the spool 12 the rotary movement of the shaft 11 is transmitted to the relatively large gear wheel 17 through the pinion 25 and gear wheels 18, thus rewinding the spring 15.

What I claim is:

1. A tatting shuttle comprising a sheath, a thread-receiving spool supported in said sheath, spring means normally tending to rotate said spool to wind the thread thereon and adapted to be automatically wound during the unwinding of the thread from the spool, releasable means for locking said spring means against operation, and means independent of said spool for winding said spring means.

2. A tatting shuttle including a sheath having a curved slot therein, a frame supported in said sheath, a thread-receiving spool supported in the frame, spring means normally tending to rotate the spool and adapted to be automatically wound as the thread is unwound from the spool, a spring actuated pawl pivotally mounted within the sheath normally engaging and locking the spring means against operation, and an arm carried by the pawl projecting exteriorly of the sheath through the slot.

In testimony whereof I affix my signature in presence of two witnesses.

JOSEPH C. BIGELOW.

Witnesses:
C. F. Hicks,
J. H. Bigelow.

Copies of this patent may be obtained for five cents each, by addressing the "Commissioner of Patents, Washington, D. C."